March 11, 1930.  E. L. ACKERMAN ET AL  1,750,208

DEMOUNTABLE RIM FOR AUTOMOBILE WHEELS

Filed Jan. 18, 1928   2 Sheets-Sheet 1

INVENTOR.
EDWARD L. ACKERMAN
ALOIS J. ZWIERZINA
BY
ATTORNEY.

March 11, 1930.  E. L. ACKERMAN ET AL  1,750,208
DEMOUNTABLE RIM FOR AUTOMOBILE WHEELS
Filed Jan. 18, 1928  2 Sheets-Sheet 2
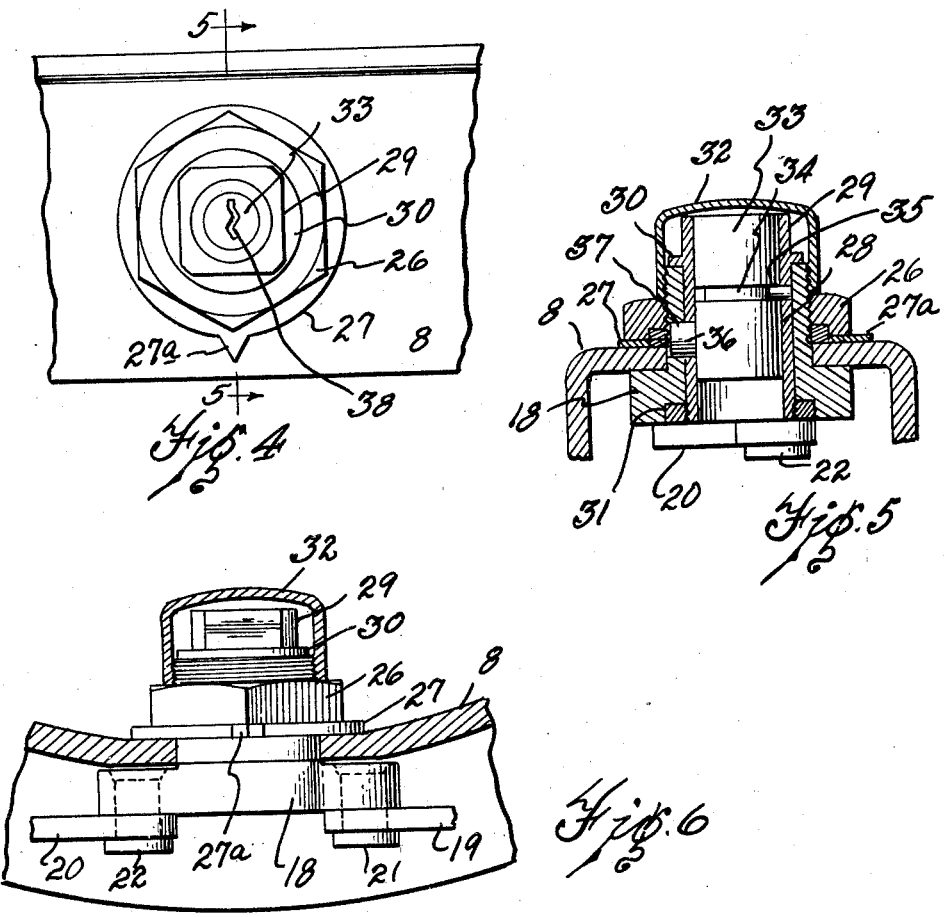
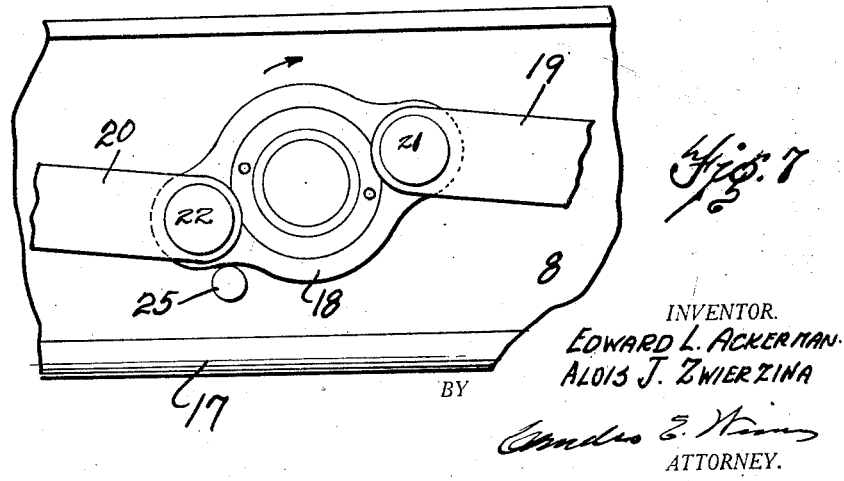
INVENTOR.
EDWARD L. ACKERMAN.
ALOIS J. ZWIERZINA
BY
ATTORNEY.

Patented Mar. 11, 1930

1,750,208

UNITED STATES PATENT OFFICE

EDWARD L. ACKERMAN AND ALOIS J. ZWIERZINA, OF DETROIT, MICHIGAN

DEMOUNTABLE RIM FOR AUTOMOBILE WHEELS

Application filed January 18, 1928. Serial No. 247,592.

This invention relates to demountable rims for automobile wheels, and the object of the invention is to provide a rim that is secured on the felloe by a single detaching bolt and that is locked in position when mounted on the rim.

In the majority of previous devices the demountable rim is held in place by some half dozen bolts and clamps which require considerable time in the removal for demounting the rim or in the fastening of the same in place when mounting the rim on the felloe. These bolts and nuts project laterally from the side of the wheel and, through being forced through the air require some engine power and also increase the noise of rotation of the wheel.

The particular feature of this invention is in the provision of a single operating bolt projecting inwardly in the center plane of the wheel and thus by reason of its position and the reduction of the number of bolts utilized the air "churning" effect is avoided and the time consumed in the positioning of the rim on the felloe or removing the same therefrom is reduced to a minimum. The invention further involves the use of a single retaining bolt which, when the rim is locked on the felloe, is freely rotatable—that is, the bolt itself is unlocked permitting rotation thereof and on being locked from rotation operatively engages the mechanism by means of which the rim is held from lateral and circumferential displacement.

These and other objects and the several novel features of the invention are hereinafter more fully described and claimed, and the preferred form of construction of a wheel rim and securing means therefor embodying our invention are shown in the accompanying drawings in which—

Fig. 4 is a plan view of the inner face of the wheel felloe showing the locking bolt.

Fig. 5 is a section on line 5—5 of Fig. 4.

Fig. 6 is an elevation showing the locking bolt and portion of the felloe to which it is secured.

Fig. 7 is a plan view looking from the lower side of Fig. 6.

Figure 1:
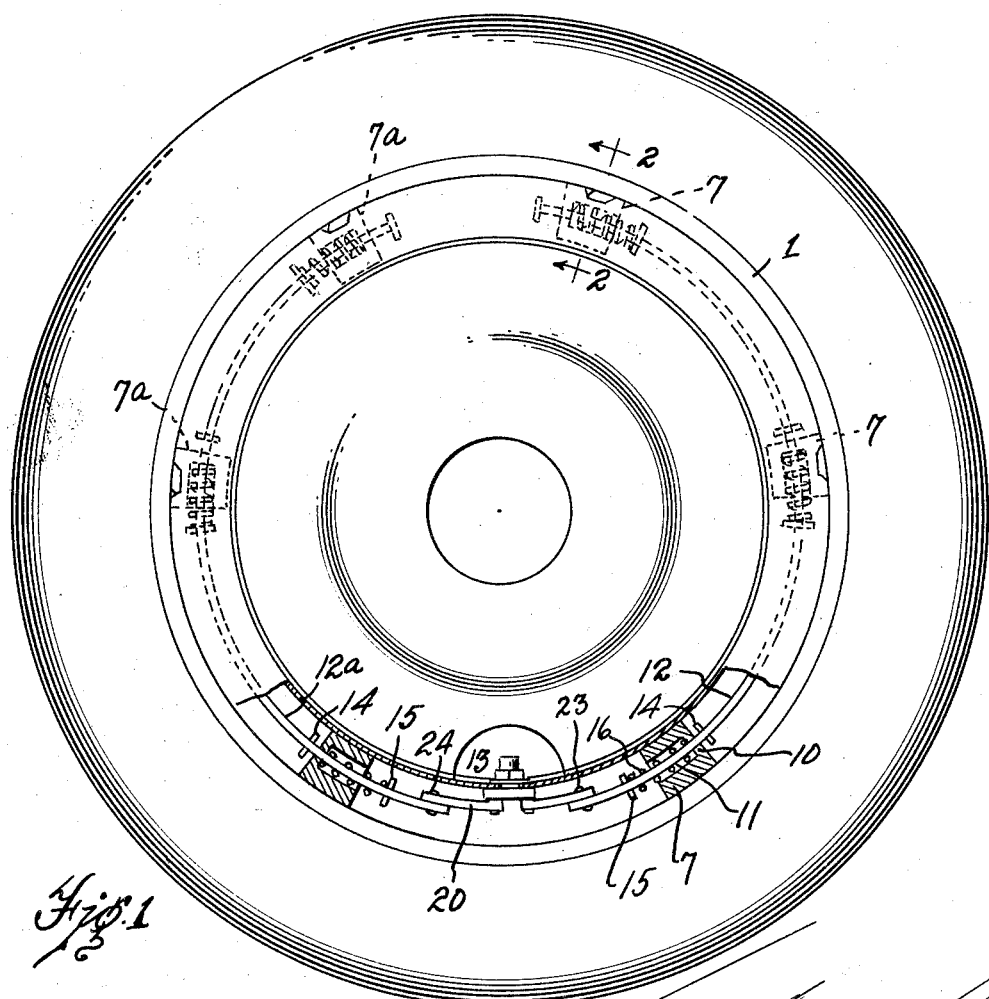
Fig. 1 is an elevation of an automobile wheel showing the rim and tire in position on the wheel.
Figure 3:
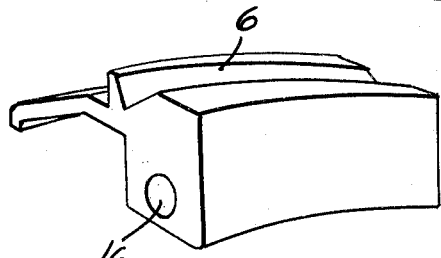
Fig. 3 is a detail in perspective of the cam used in locking the wheel in place.
Figure 2:
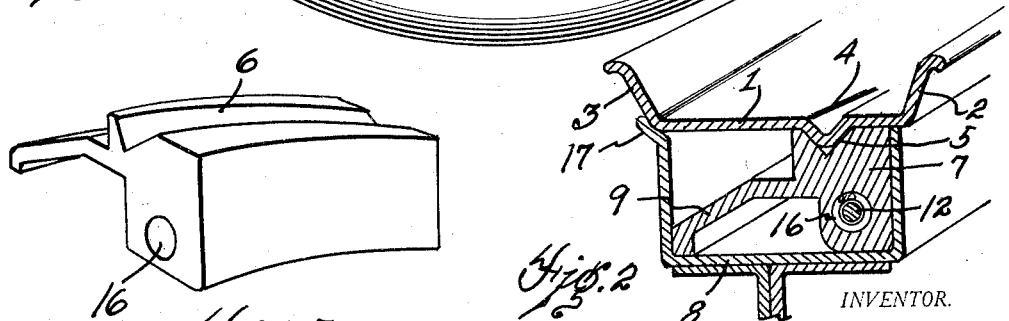
Fig. 2 is a section partly in perspective taken on line 2—2 of Fig. 1.

The rim, which is of the ordinary split type, has the usual side flanges 2 and 3 in which the base of the tire is received and this rim has depressions 4 of comparatively short length formed therein from the outer side of the rim providing the projections 5 in the inner face thereof as will be understood from Fig. 2. There are usually provided six of these projections which lie at an angle to the center plane of the wheel and these projections 5 may engage in the cam groove 6 of the sliding cams 7 or 7ª which fit in the channel like felloe 8 attached to the wheel body. This wheel body may be of any approved form, being here shown as of the disc type, and the cam members 7 and 7ª are formed at one side to practically fit the channel, as will be understood from Fig. 2, and further having a projecting side flange 9 fitting against the opposite side wall of the channel 8 sustaining the cam member from lateral movement in the channel. These cams are each further provided with a central aperture 10 at the bottom of a recess 11 formed therein as will be understood from Fig. 1. The cam operating rods 12 and 12ª are semi-circular in form and extend in opposite directions from the operating bolt indicated generally at 13. Each of these rods extends through the recess and aperture of the respective cam members 7 or 7ª and each rod is provided with pins 14 and 15 adjacent each cam member which are a somewhat greater distance apart than the length of the cam as will be understood from Fig. 1. A spring 16 is provided back of the forward pin 15 in each case extending into the recess 11 of the cam block and movement of these cam blocks is secured through rotation of the control bolt 13 hereinafter described which moves the rods 12 and 12ª circumferentially in one direction or the other, the rods being forced away from each other in the securing of the rim in place and drawn toward each other in releasing the rim. In the movement of these rods 12 and 12ª from each other or from the control bolt 13, the pin 16 compresses the spring of the respective cam causing it to slide and to engage the respective angularly positioned projection 5 and thus force the rim laterally onto the channel felloe 8. This channel, on the inner face of the wheel, is provided with a flange 17 forming a seat for that side of the rim on being forced to position by movement of the cam member. Likewise, on operation of the bolt 13 to move the rods together, the pin 14 engages the respective cam block 7 or 7ª forcing the same out of engagement with the respective projection 5 therefor which tends to first force the rim off from the felloe and thereafter permit its ready removal.

The above described mechanism is in a general way to be found in prior art and this invention is not directed to specific features of construction described, the invention here relating more specifically to the operating means which is adaptable for use with any sort of cam like element or elements by which the rim is held from lateral displacement when positioned on the felloe. This operating device is shown more clearly in Figs. 4 to 7 inclusive and consists, in conjunction with the felloe portion 8, of a rotatable actuator 18 having an enlarged part within the channel to opposite ends of which the operating bars 19 and 20 are connected by pivots 21 and 22 respectively. The opposite ends of the bars 19 and 20 are pivotally connected at 23 and 24 to the respective cam operating rods 12 and 12ª as will be understood from Fig. 1. By this direct connection of the actuator 18 with the rods, rotation thereof in the direction indicated by the arrow in Fig. 7 will draw the rods 12 and 12ª toward each other and force the cams out of engagement with the depressions 5 of the rim and releasing the rim. Rotation in the opposite direction locks the rim in place preventing accidental removal thereof. A pin 25 is provided in the bottom of the channel 8 which limits the extent of rotation of the actuator 18 in either direction.

This member 18 has a cylindrical threaded portion extending through the bottom of the channel 8 toward the axis of the wheel as will be understood from Figs. 1 and 5 and a retaining nut 26 is secured on the outer end thereof shown in Fig. 5 to prevent removal of the member 18. A washer 27 having a portion 27ª is interposed between the nut and the felloe 8 and under certain conditions this nut 26 and actuator 18 are rotatable in the aperture provided therefor. The portion 27ª indicates to the operator the extent to which the actuator has been rotated. Within the hollow interior of the actuator 18 is a cylindrical shell 28 which has a squared end 29 and a circular flange 30 engaging the outer end of the actuator 18. The inner end of this member 28 is threaded and a retainer nut 31 is provided in a recess in the member 18 and practically flush with the outer face thereof which holds this member 28 in position with the flange 30 in engagement with the end of the actuator 18. A dust cap 32 is provided over the end of the member 28 and in threaded relation with the end of the actuator 18 when the parts are assembled as shown in Fig. 5.

Within the shell 28 is the lock member 33 the barrel of which is provided with a circumferential groove 34 into which a stationary pin 35 secured in the shell 28 extends and holds the lock barrel from longitudinal movement in the shell 28. This lock is of the usual Yale type and has a lock pin 36 thereon which, when the parts are locked, projects into an aperture 37 provided therefor in the actuator 18. When the parts are in the position shown in Fig. 5 and the dust cap 32 removed, a wrench may be utilized to turn the shell 28 and actuator 18 which by rotation in one direction or the other, operates the bars 12 and 12ª and consequently the cam members as previously described.

The principal feature of this invention resides in the combination with the means for securing the rim on the felloe of a rotatable operating device which, when the rim is secured on the felloe, may revolve without operation of the securing means and when the operating device is locked will by rotation release the securing means. In fact this lock device is used to lock the shell 28 to the actuator or to release it from locked relation therewith. Thus, in order to remove the rim the lock must first be locked in order that the retaining means for the rim may be released or unlocked.

In the operation of the device the rim is placed in position on the felloe, the lock member locked and a wrench applied to the squared end of the shell 28 and rotated to cause movement of the cam members to engage the depressions or lugs on the rim thus forcing the rim to final position on the felloe. Thereupon, after removal of the wrench, the lock barrel is unlocked and thus any subsequent application of the wrench to the shell 20 is ineffective to operate the cam members and release the rim. In view of use of a lock requiring a key the ready removal of a tire from a rim by unauthorized persons is materially hindered. This is particularly due to the fact that the cam members are housed within the channel 8 providing the felloe and are not in position to be readily tampered with and the removal of the lock and barrel as by means of a hammer is ineffective in releasing the rim. Therefore, by our construction not only is a quick detachable rim secured requiring only the operation of one nut (which affords a considerable saving in the labor of positioning or removal of the rim on the felloe) but a structure is provided making it difficult to remove a tire and rim from the wheel without the use of a key.

Having thus briefly described our invention, its utility and mode of operation, what we claim and desire to secure by Letters Patent of the United States is—

1. A device for locking a wheel rim to a felloe with which is provided cooperating parts for securing or releasing the rim relative to the felloe, comprising a means enclosed within the felloe, when the rim is in position, for operating the said cooperating parts consisting of an actuator element extending radially through the inner face of the felloe and by rotation of which in one direction or the other the said parts are actuated to respectively secure or release the rim, an operating device for the said actuator consisting of a hollow element rotataby mounted in the inner end of the actuator, and a lock device in the said hollow operator rotatable on the same axis and adapted to lock the operator to the actuator or release the same therefrom.

2. A device for locking a wheel rim to a felloe with which is provided means for securing or releasing the rim relative to the felloe enclosed between the felloe and rim when the parts are assembled, and an actuator for operating the said means, said actuator having a hollow stem extending radially inwardly through the felloe, comprising an operator therefor consisting of an element rotatably mounted in the stem and having a projecting end adapted for the application of a wrench, a lock element consisting of a barrel in said rotatable operator rotatable on the same axis and held from longitudinal movement therein, and a key operated lock bolt adapted to lock the operator to the actuator.

3. A device for locking a wheel rim to a felloe with which is associated a means for securing therein to the felloe enclosed between the felloe and rim, consisting of the combination of a rotatable actuator for operating the said means for secure or release the rim relative to the felloe, an operating device therefor comprising a shell rotatably mounted on the axis of the actuator and held for relative longitudinal movement and having an inwardly projecting end adapted for the application of a turning implement, a lock barrel mounted to rotate within the shell on the axis thereof and held for relative longitudinal movement, and a lock bolt adapted when projected to lock the shell and actuator together and when retracted to permit rotation of the shell relative to the actuator.

In testimony whereof we sign this specification.

EDWARD L. ACKERMAN.
ALOIS J. ZWIERZINA.